United States Patent [19]

Steuck

[11] Patent Number: 4,618,533
[45] Date of Patent: Oct. 21, 1986

[54] POROUS MEMBRANE HAVING HYDROPHILIC SURFACE AND PROCESS

[75] Inventor: Michael J. Steuck, N. Reading, Mass.
[73] Assignee: Millipore Corporation, Bedford, Mass.
[21] Appl. No.: 676,681
[22] Filed: Nov. 30, 1984
[51] Int. Cl.[4] .............................................. B32B 3/26
[52] U.S. Cl. ................................. 428/315.7; 521/27; 427/245; 427/393.5
[58] Field of Search ................. 521/27, 28; 525/329.4, 525/329.7

[56] References Cited

U.S. PATENT DOCUMENTS

| | | | |
|---|---|---|---|
| 2,965,697 | 12/1960 | Duddy | 521/28 |
| 3,276,598 | 10/1966 | Michaels et al. | 521/27 |
| 3,945,927 | 3/1976 | Imai et al. | 521/28 |
| 3,966,679 | 6/1976 | Gross | 525/329.4 |
| 4,360,434 | 11/1982 | Kawoguchi et al. | 521/28 |

Primary Examiner—Joseph L. Schofer
Assistant Examiner—Peter F. Kulkosky
Attorney, Agent, or Firm—Andrew T. Karnakis; Paul J. Cook

[57] ABSTRACT

A composite porous membrane is formed from a porous polymeric membrane having desired bulk properties on which is directly coated a cross-linked polymer having desired surface properties. The composites membrane retains the porosity of the porous polymeric membrane. A preferred composite porous membrane is formed from a porous polyvinylidene fluoride to which is directly coated with a polymer formed of a cross-linked hydroxyalkyl acrylate.

38 Claims, No Drawings

POROUS MEMBRANE HAVING HYDROPHILIC SURFACE AND PROCESS

BACKGROUND OF THE INVENTION

This invention relates to a porous membrane having bulk properties which differ from its surface properties and to a process for making the same. More particularly, this invention relates to a microporous or ultrafiltration membrane formed from a hydrophobic substrate having a hydrophilic surface including the membrane pore surfaces and to a process for forming such a membrane.

In many applications of filtration technology, it is desirable to utilize a membrane filter which is mechanically strong, is thermally stable, is relatively inert chemically and is insoluble in most organic solvents. Often, it is desirable that the membrane have surface properties which are radically different from, and sometimes incompatable with the bulk properties set forth above. Desirable surface properties include wettability, low protein adsorbing tendency, thromborestivity, controlled ion exchange capacity and controlled surface chemical reactivity.

Conventional methodology presently used to achieve the duality of function of bulk properties which differ from the surface properties is to coat a performed membrane having the desired bulk properties with an oligomer or polymer having the desired surface properties. Typical coating materials include surfactants and water soluble polymers such as polyvinylpyrrollidone. This approach to modifying surface properties is undesirable since the coating is only temporary and exposure to any process fluid, particularly when the substrate having the desired bulk properties is a porous membrane, effects removal of the coating from the porous membrane. Membranes treated in this fashion cannot be steam sterilized, cannot be rewet once dried after being wetted with water and exhibit high extractable levels. These properties are unacceptable in many filtration applications, particularly when processing biological fluids which are to be sterilized or subsequently analyzed.

It also has been proposed to utilize graft polymerization techniques to modify the surface characteristics of a polymeric substrate. Typical examples of graft polymerization are shown for example in U.S. Pat. Nos. 3,253,057; 4,151,225; 4,278,777 and 4,311,573. It is difficult to utilize presently available graft polymerization techniques to modify the surface properties of the porous membrane. This is because it is difficult to modify the entire surface of the membrane including the surfaces within the pores while avoiding pore blockage and while retaining membrane porosity. In U.S. Pat. No. 4,340,482, issued July 20, 1982, it has been proposed to modify the surface of porous membranes formed from hydrophobic fluorine-containing polymers by binding a primary amine such as glycine to the hydrophobic substrate. The primary amine renders the polymer surface hydrophilic and can be utilized as a reactant site to link a polymerizable monomer to the porous membrane thereby to obtain a porous membrane having surface properties corresponding to that of the polymerized monomer. Unfortunately, the modified membranes so-produced exhibit properties which are undesirable for use with certain materials. Thus, the membrane so-produced oftentimes is colored that is, a non-white color, and gives off colored extractable compositions during use. Furthermore, the membranes have a tendency to adsorb proteins from solution and therefore are unacceptable in some applications such as in clinical diagnostic assays. Accordingly, it would be highly desirable, for example, to provide a composite membrane having both desirable bulk physical strength and chemical resistance while having desired surface properties different from the bulk properties. Furthermore, it would be desirable to provide a membrane which is not colored by virtue of surface modification thereof, which is characterized by very low levels of extractables and which exhibits very low adsorptivity for proteins.

SUMMARY OF THE INVENTION

This invention provides a composite porous membrane comprising a porous membrane substrate having characteristic bulk properties and having a permanent coating grafted and/or deposited thereon for the entire porous membrane including the inner pore walls which coating has physical and chemical properties different from the bulk properties of the porous membrane. Unlike the composite membrane products of the prior art, the coating polymer is directly coated onto the substrate polymer without the utilization of an intermediate binding chemical moiety. The bulk properties of the porous membrane include inertness to most organic solvents, inertness to many chemical reagents, good tensile strength and ductility. The surface of the composite membrane is hydrophilic, has a very low level of extractables, does not have colored extractables and can be made to have a controlled ion exchange capacity. In addition, the surface of many of the composite membranes of this invention have a very low affinity for proteins and have low thrombogenicity or are non-thrombogenic. Therefore, the composite membranes of this invention can be used in filtration processes which utilize organic solvents as in the pharmaceutical industry and with liquids containing concentrated acids as is commonly encountered in the electronic industries. Since the surface of the membrane has low protein adsorbing capacity, the composite membranes are useful in apparatus for analyzing, filtering or treating body fluids including blood or blood plasma.

DESCRIPTION OF SPECIFIC EMBODIMENTS

In accordance with this invention a polymeric porous membrane having the desired bulk properties is directly coated throughout its entire surface with a polymerized cross-linked monomer having the desired surface properties. The monomer is deposited on the surfaces of the porous membrane by graft polymerization and/or by deposition of the cross-linked monomer. The desired deposition of the cross-linked monomer onto the porous membrane is effected as a direct coating and does not require or utilize an intermediate binding chemical moiety such as an amino acid or the like. The term "polymer" as used herein is meant to include polymeric compositions formed from one or more monomers. Representative suitable polymers forming the porous membrane include polyolefins such as polyethylene, polypropylene, polymethylpentene, or the like; polystyrene or substituted polystyrenes; fluorinated polymers including poly(tetrafluoroethylene), polyvinylidene fluoride or the like; polysulfones such as polysulfone, polyethersulfone or the like; polyesters including polyethylene terephthalate, polybutylene terephthalate or the like; polyacrylates and polycarbonates; vinyl polymers such as poly vinyl chloride and polyacrylonitriles. Copolymers also can be employed such as copolymers of butadiene and styrene, fluorinated ethylene-propylene copolymer, ethylene-chlorotrifluoroethylene copolymer or the like. The only requirement for the polymerized monomer is that it is capable of coating the entire surface of the porous membrane and that it provide the surface with different properties then the bulk porous membrane. Generally, the porous membrane has an average pore size between about 0.001 and 10 microns and more usually between about 0.1 and 5.0 microns.

The polymerization and cross-linking of the polymerizable monomer to the porous membrane by grafting and/or deposition must be effected so that the entire surface of the porous membrane including the inner surfaces of the pores is coated entirely with a cross-linked/grafted polymer. Therefore, in a first step, the porous membrane is washed with a solvent composition that does not swell or dissolve the porous membrane and which wets the surfaces of the pores such as a mixture of water and an organic solvent. Suitable water-solvent compositions for this purpose include methanol/water, ethanol/water, acetone/water, tetrahydrofuran/water or the like. The purpose of this wetting step is to assure that the monomer composition subsequently contacted with the porous membrane wets the entire surface of the porous membrane. This preliminary wetting step can be eliminated when the reagent bath described below itself functions to wet the entire surface of the porous membrane. This can be effected when the reagent both contains a high concentration of organic reactants, for example 15% by weight or higher. In any event, all that is required is that the entire porous surface be wet so that the polymerizable monomer wets the entire surface of the porous membrane.

Subsequent to wetting the porous membrane, a reagent bath comprising a free radical polymerizable monomer, a polymerization initiator and cross-linking agent in a solvent for these three constituents is contacted with the porous membrane under conditions to effect free radical polymerization of the monomer and coating of the porous membrane with the cross-linked polymer. When the monomer is difunctional or has higher functionality, an additional cross-linking agent need not be utilized.

Any monomer for coating the polymer can be utilized herein so long as it is capable of being polymerized by free radical polymerization and can be cross-linked. Representative suitable polymerizable monomers include hydroxyalkyl acrylates or methacrylates including 1-hydroxyprop-2-yl acrylate and 2-hydroxyprop-1-yl acrylate, hydroxypropylmethacrylate 2,3-dihydroxypropyl acrylate, hydroxyethylacrylate, hydroxyethyl methacrylate or the like or mixtures thereof. Other polymerizable monomers which can be utilized herein include acrylic acid 2-N,N-dimethylaminoethyl methacrylate, sulfoethylmethacrylate or the like, acrylamides, methacrylamides, ethacrylamides, etc. These monomers are examples of polar-substituted or functionally substituted monomers useful herein.

Suitable initiators and cross-linking agents for the monomers set forth above are well known in the art. For example, when utilizing acrylates as the polymerizable monomer, suitable polymerization initiators include ammonium persulfate, potassium persulfate, 4,4'-azobis(4-cyanovaleric acid) 2,2'-azobis(2-amidinopropane)hydrochloride, potassium hydrogen persulfate (Oxone) or the like. When utilizing acrylates or methacrylates or methacrylamides as the polymerizable monomer, suitable cross-linking agents include difunctional acrylates, methacrylates or acrylamides such as tetraethylene glycol diacrylate, glycidyl acrylate or methylene bisacrylamide or the like. In one embodiment of this invention, cross-linking agents having difunctionality or higher functionality, these agents can be utilized without an additional monomer in the coating of this invention. The monomer, polymerization initiator and cross-linking agents are contacted with the porous membrane as a mixture in a solvent which is compatible with the three reactants and the porous membrane so that the desired free radical polymerization and cross-linking is achieved without the formation of a significant amount of slowly extractable by-products and without the formation of colored products. If readily extractable by products are formed, these can be removed by conducting a washing step in a suitable solvent subsequent to the coating step.

The particular solvent employed for the polymerizable monomer, polymerization initiator and cross-linking agent will depend upon the particular reactants employed and upon the particular polymer utilized to form the porous membrane. All that is necessary is that the reactants dissolve in the solvent and are capable of being reacted by free radical initiation in the solvent system and that the solvent does not attack the porous membrane substrate. Thus, the particular solvent system used will depend upon the reactants and porous membranes employed. Representative suitable solvents include water or organic solvents such as alcohols, esters, acetone or compatible aqueous mixtures thereof.

Generally, the polymerizable monomer is present in the reactant solution at a concentration between about 1% and about 20%, preferably between about 3% and about 9% based upon the weight of the reactant solution. The cross-linking agent generally is present in an amount of between about 0.4% and about 100% by weight, preferably between about 1% and about 20% by weight based upon the weight of the polymerizable monomer. Greater amounts of cross-linking agents can be used but no significant advantage is gained thereby. The polymerization initiator is present in an amount of between about 1% and about 25% by weight, preferably between about 5% and about 20% by weight, based upon the weight of the polymerizable monomer. The concentration of initiator utilized herein is much higher than normally utilized when polymerizing monomers. Polymerization initiators are normally used at a concentration of about 0.1 wt. % based upon the weight of monomer. Although applicant does not bound by this theory, it is believed that the high concentration of initiator used herein limits the length of the polymer chains thereby avoiding pore plugging while uniformly coating the entire exposed pore surface of the substrate polymer. As noted above, the cross-linking agent can be utilized without the monomer and thereby functions as the polymerizable monomer.

Any conventional energy source for initiating free radical polymerization can be employed such as heating, ultraviolet light, gamma radiation, electron beam radiation or the like. For example, when free radical polymerization is initiated by heating, the reactant solution and the porous membrane are heated to a temperature at least about 60° C. and up to the temperature at which undesirable bulk polymerization occurs in solution or at which the solvent begins to boil. For example, generally suitable temperatures when utilizing an aqueous solvent system between about 80° C. and about 95° C., preferably between about 88° C. and about 92° C. The polymerization reaction should be effected for a time to assure that the entire exposed surface of the porous membrane is coated with the deposited polymer composition but without plugging of the pores in the membrane. Generally, suitable reaction times are between bout 0.1 and about 30 minutes, preferably between about 1 and about 2 minutes. Reaction can be effected while the porous membrane is immersed in solution. However, this will result in the polymerization of the monomer throughout the solution. It is preferred to saturate the porous membrane with the reactant solution and to effect reaction outside of the solution so that monomer is not wasted. Thus, the reaction can be conducted batchwise or continuously. When operating as a continuous process, a sheet of porous membrane is saturated with the reactant solution and then transferred to a reaction zone where it is exposed to energy to effect the polymerization reaction.

EXAMPLES 1-6

In these examples, a polyvinylidene fluoride (PVDF) microporous membrane, having an average pore size of 0.2 micron and average thickness of 100 microns, is treated to produce a hydrophilic surface.

Six aqueous solutions were prepared with the compositions listed in Table 1. Solid sodium hydroxide was added to each solution to adjust to pH 5.5–5.6.

TABLE 1

| Exam. No. | g. HPA | g. TEGDA* | g. water | g. ACVA* |
|---|---|---|---|---|
| 1 | 7.0 | 0 | 92.0 | 1.0 |
| 2 | 7.0 | 0.1 | 91.9 | 1.0 |
| 3 | 7.0 | 0.2 | 91.8 | 1.0 |
| 4 | 7.0 | 0.5 | 91.5 | 1.0 |
| 5 | 7.0 | 0.75 | 91.25 | 1.0 |
| 6 | 7.0 | 1.0 | 91.0 | 1.0 |

*HPA = mixture of 2-hydroxyproplyl acrylate (75%) and 2-hydroxy-prop-2-yl acrylate (25%)
*TEGDA = tetraethyleneglycol diacrylate
*ACVA = 4,4'-azobis (4-cyanovaleric acid)
g = grams Six weighed sets of PVDF membrane disks were prepared; each set consisting of thirty 47 mm diameter disks. Each set of disks was wet in methanol, removed and drained, and then rinsed in water to removed the methanol. One set of water-wet disks was placed in each solution, and the solution and disks were gently shaken for 2 hrs. to effect exchange of water in the pores for the polymerization solution. The six solutions and disks were placed in an autoclave and heated at F. 121° for 15 min. on a liquid cycle. After completion of the heating cycle, the solutions were decanted from the disks. Each set of disks was rinsed in cold, running water for one hour and then further rinsed for one hour in boiling methanol. The disks were then dried under ambient conditions.

The resulting membranes were weighed and tested for rewet with water and the water flow time was measured. Results are shown in Table 2.

TABLE 2

| Exam. No. | Weight per cent. gained | Water rewet Time (sec) | Water Permeability (cm/sec-Pa × $10^7$) |
|---|---|---|---|
| 1 | 0.85 | hydrophobic | 5.33 |
| 2 | 5.30 | 4 sec. | 1.81 |
| 3 | 5.82 | 2 sec. | 2.87 |
| 4 | 7.23 | 1 sec. | 3.75 |
| 5 | 9.09 | instant | 3.75 |

TABLE 2-continued

| Exam. No. | Weight per cent. gained | Water rewet Time (sec) | Water Permeability (cm/sec-Pa × $10^7$) |
|---|---|---|---|
| 6 | 8.69 | instant | 3.95 |

EXAMPLES 7-12

These examples used the microporous PVDF employed in Examples 1-6.

Six aqueous solutions were prepared with the compositions listed in Table 3.

TABLE 3

| Exam. No. | g. HPA* | g. TEGDA* | g. Glycd. A* | g. Water | g. AmPS* |
|---|---|---|---|---|---|
| 7 | 7.0 | 0.1 | — | 91.9 | 1.0 |
| 8 | 7.0 | 0.25 | — | 91.75 | 1.0 |
| 9 | 7.0 | — | 0.1 | 91.9 | 1.0 |
| 10 | 7.0 | — | 0.25 | 91.75 | 1.0 |
| 11 | 7.0 | — | — | 92.0 | 1.0 |
| 12 | — | — | — | 99.0 | 1.0 |

*HPA = mixture of 2-hydroxyproplyl acrylate (75%) and 2-hydroxy-prop-2-yl acrylate
*TEGDA = tetraethyleneglycol diacrylate
*GlycdA = glycidyl acrylate
*AmPS = ammonium persulfate
g = grams Six sets of PVDF membrane disks were prepared, each set consisting of five 47 mm. diameter disks. Each set of disks was wet in methanol and then rinsed in water. One set of water-wet disks was placed in each solution for 10 min. and then removed. The disks were placed on a sheet of polyester and covered with another sheet of polyester, squeezing gently to remove air bubbles. The polyester sheets were held against a heated photodrier at 95° C. for 2 min. The treated disks were removed from the polyester sheets, rinsed 10 min. in running water and then rinsed 10 min. in boiling methanol. After drying, the disks were tested for water rewet and water flow time. The results are shown in Table 4.

TABLE 4

| Exam. No. | Water Rewet Time | (cm/sec-Pa × $10^7$) |
|---|---|---|
| 7 | 1 sec. | 4.11 |
| 8 | 0.5 sec. | 3.95 |
| 9 | 3 sec. | 4.00 |
| 10 | 2 sec. | 4.98 |
| 11 | 5 min. | 4.83 |
| 12 | hydrophobic | 5.24 |

EXAMPLE 13

A cationically charged PVDF membrane was prepared from 8 micron PVDF microporous membrane. After soaking water-wet membrane in a monomer solution prepared from N,N-dimethylaminoethyl methacrylate (10 g), methylene-bis-acrylamide (0.5 g), water (90 g), and 4,4'-azobis(4-cyanovaleric acid) (1.0 g), the monomer-wet membrane was sandwiched between sheets of polyester and heated between metal plates for 30 min. in a 125° C. oven. After rinsing successively in water and in a mixture of alcohol and aqueous hydrochloric acid, the membrane was soaked 1 hour in methanol. After drying, the membrane was rewet with water. Upon titration with standard base, the ion exchange capacity was 0.005 meq/g.

EXAMPLE 14

Water-wet polypropylene membrane (0.2 micron pore size) was exchanged in an aqueous solution containing 10% hydroxypropyl acrylate, 1% tetraethylene glycol diacrylate and 1% potassium persulfate. After heating 2 min at 96° C. between polyester sheets, the membrane was rinsed in water for 2 min and boiled in methanol for 30 min. After drying, the membrane rewet instantly with water.

EXAMPLE 15

A glycerinized polysulfone ultrafiltration membrane (molecular weight cut off 100,000 cast on a polyolefin nonwoven web) was rinsed in water and covered with a solution containing 7% hydroxypropyl acrylate, 0.03% propylene glycol diacrylate, and 1% 4,4'-azobis(-4cyanovaleric acid) adjusted to pH 5.5. After heating in an autoclave at 100° C. for 15 min, the membrane was rinsed in running water for 1 hr. and in boiling methanol for 1 hr. After drying, the membrane rewet in water. The treated membrane had 40% rejection of albumin (MW 67,000) and 75% rejection of IgG (MW 160,000); untreated membrane had rejections of 20% and 70%, respectively.

EXAMPLE 16

A track-etched polycarbonate membrane (0.03 micron pore size) was treated as Example 15. After drying, the membrane rewet in water.

EXAMPLES 17-30

Polytetrafluoroethylene microporous membrane (0.2 micron) was treated as in Examples 7-12 with the monomer-crosslinker aqueous solutions listed in Table 5.

TABLE 5

| Example No. | % HPA* | % TEGDA* | % AmPS* |
| --- | --- | --- | --- |
| 17 | 7 | 0.5 | 1 |
| 18 | 5 | 0.5 | 1 |
| 19 | 3 | 0.5 | 1 |
| 20 | 2 | 0.5 | 1 |
| 21 | 3 | 0 | 1 |
| 22 | 3 | 0.25 | 1 |
| 23 | 3 | 0.5 | 1 |
| 24 | 3 | 1.0 | 1 |
| 25 | 2 | 2.0 | 1 |
| 26 | 0.5 | 2.0 | 1 |
| 27 | 0 | 1.0 | 1 |
| 28 | 0 | 2.0 | 1 |
| 29 | 0 | 3.0 | 1 |
| 30 | 0 | 3.0 | 0.5 |
| Control | 0 | 0 | 0 |

*HPA = mixture of 2-hydroxyprop-1-yl acrylate (75%) and 1-hydroxyprop-2-yl acrylate (25%)
TEGDA = tetraethylene glycol diacrylate
AmPS = ammonium persulfate
% = weight percent based upon weight of solution.

After rinsing in boiling methanol, the weight percent add on, wettability and the flow time were measured, Table 6.

TABLE 6

| Example No. | Wt % add on | Water Permeability (cm/sec-Pa × $10^7$) | Water Wettability |
| --- | --- | --- | --- |
| 17 | 3.6 | 3.62 | Less than 5 sec |
| 18 | 1.7 | 2.25 | Less than 5 sec |
| 19 | 1.4 | 3.90 | Less than 5 sec |
| 20 | 0.3 | 4.68 | hydrophobic |
| 21 | 0.2 | 3.95 | " |
| 22 | 0.7 | 3.75 | Less than 2 min |
| 23 | 1.4 | 3.90 | Less than 5 sec |
| 24 | 1.3 | 3.49 | Less than 5 sec |
| 25 | 2.4 | 2.79 | Less than 5 sec |
| 26 | 1.8 | 3.20 | Less than 2 min |
| 27 | 1.2 | 3.75 | Less than 5 sec |
| 28 | 2.2 | 3.20 | Less than 5 sec |
| 29 | 3.3 | 3.58 | Less than 5 sec |
| 30 | 2.7 | 3.07 | Less than 5 sec |
| control | 0 | 4.00 | hydrophobic |

EXAMPLE 31

Microporous PVDF film (0.2 micron pore size) was treated as in Examples 7-12 with a solution containing 7% hydroxypropyl acrylate, 0.03% propylene glycol diacrylate, and 2% 2.2'-azobis(2-amidinopropane)hydrochloride. After rinsing and drying, the weight gain was 4.1%. The membranes rewet with water.

EXAMPLE 32

Hydrophilized PVDF film (0.2 micron pore size) was prepared as in Examples 7-12 by treatment with the aqueous solutions listed in Table 7.

TABLE 7

| Solu. | % HPA* | % TEGDA* | % GlycdA* | % AmPS* |
| --- | --- | --- | --- | --- |
| A | 7 | 0.5 | — | 1 |
| B | 7 | 1.0 | — | 1 |
| C | 7 | — | 0.5 | 1 |
| D | 7 | — | 1.0 | 1 |

*HPA = mixture of 2-hydroxyproplylacrylate (75%) and 2-hydroxy-prop-2-yl (25%)
*TEGDA = tetraethylene glycol diacrylate
*GlycdlA = glycidyl acrylate
*AmPS = ammonium persulfate
% = weight precent based on weight of solution.

After thorough rinsing, 13 mm disks of the colorless hydrophilic membranes were dried. Protein adsorption was measured by exposure for 1 hr. to 4000 ug of a mixture of human albumin (2500 ug) and human IgG (1500 ug) in 0.1M phosphate buffer at pH 7.4. The membrane disk was rinsed in phosphate buffer for ½ hr and then exposed to Ponceau S dye (0.2% in 3% trichloroacetic acid and 3% sulfosalicylic acid). After rinsing 3x with 5% acetic acid to remove unbound dye, the membrane-bound dye was desorbed with 0.1M sodium hydroxide. After acidification, the desorbed dye was quantitated by reading the absorbance at 520 mm. A standard curve for protein concentration was prepared by hydrophobic adsorption of protein on untreated PVDF. The treated membranes had very low protein adsorption, as shown in Table 8.

TABLE 8

| Membrane | ug protein adsorbed |
| --- | --- |
| A | 0 |
| B | 1.0 |
| C | 0.3 |

TABLE 8-continued

| Membrane | ug protein adsorbed |
| --- | --- |
| D | 0.4 |
| Control (untreated) | 180 |

EXAMPLE 33

Water wet microporous PVDF film (0.2 micron pore size) was soaked in a solution of cobalt (II) oxalate (prepared from 0.5 cobalt (II) oxalate, 55 ml 28% ammonium hydroxide, and 45 ml water) for 30 min, removed, and dried to give a PVDF membrane with cobalt (II) oxalate on its surface. The membrane was then rewet in methanol, rinsed in water, and soaked in a solution containing 7% hydroxypropyl acrylate and 1% Oxone (monopersulfate compound, $2KHSO_5.KHSO_4.K_2SO_4$) for 30 min. The membrane in the above solution was heated at 121° F. for 15 min in an autoclave. The membrane was rinsed in water, boiled in methanol for 1 hr, and dried to yield a colorless, hydrophilic membrane with a 2.6% weight increase. This membrane rewet instantly with water.

EXAMPLE 34

Microporous PVDF film (0.2 u pore size) was wet in methanol, rinsed in water, and soaked in an aqueous solution containing 5% hydroxypropyl acrylate, 1% glycidyl acrylate, and 1% ammonium persulfate. The membrane was sandwiched between sheets of polyethylene and exposed to UV light at 254 nm for 5 min. (The UV light source was 2×18" 15 watt germicidal lamps at 6" distance). After rinsing in water and boiling methanol, the membrane was colorless and rewet in water.

EXAMPLE 35

Microporous PVDF (0.6 u pore size) was hydrophilized as in Examples 7–12. The hydrophilization solutions are shown in Table 9, along with the weight percent extractables, measured by an overnight Soxhlet extraction in methanol.

TABLE 9

| Solu | % HPA* | % TEGDA* | % AmPS* | % extractable |
| --- | --- | --- | --- | --- |
| A | 3 | 0 | 0.25 | 0.19 (Note 1) |
| B | 3 | 0.25 | 0.25 | 0.24 |
| C | 3 | 0.5 | 0.25 | 0.15 |
| D | 3 | 0 | 0.5 | 0.17 |
| E | 3 | 0.25 | 0.5 | 0.21 |
| F | 3 | 0.5 | 0.5 | 0.15 |
| G | 5 | 0 | 0.25 | 0.19 (Note 1) |
| H | 5 | 0.25 | 0.25 | 0.10 |
| I | 5 | 0.5 | 0.25 | 0.08 |
| J | 5 | 0 | 0.5 | 0.17 (Note 1) |
| K | 5 | 0.25 | 0.5 | 0.14 |
| L | 5 | 0.5 | 0.5 | 0.12 |
| M | 5 | 0.25 | 1.0 | 0.12 |
| N | 7 | 0.25 | 0.5 | 0.08 |
| O | 7 | 0.12 | 1.0 | 0.34 |
| P | 7 | 0.18 | 1.0 | 0.10 |
| Q | 7 | 0.25 | 1.0 | 0.11 |

*HPA = 2-hydroxy-prop-1-yl acrylate (75%) and 1-hydroxy-prop-2-yl acrylate (25%)
TEGDA = tetraethylene glycol diacrylate
AmPS = ammonium persulfate
Note 1 = These membranes were hydrophobic, all others were hydrophilic.
% = weight percent based on weight of solution.

I claim:

1. A composite porous thermoplastic membrane which comprises a porous membrane substrate having an average pore size between about 0.001 and 10 microns formed of a first polymer, said substrate being directly coated on its entire surface with a cross-linked second polymer formed from a monomer polymerized in situ with a free radical initiator and cross-linked in situ on said substrate, said composite porous membrane having essentially the same porous configuration as said porous membrane substrate.

2. The composite porous membrane of claim 1 wherein the first polymer is a halogenated hydrocarbon polymer.

3. The composite porous membrane of claim 1 wherein the first polymer is a fluorinated hydrocarbon polymer.

4. The composite porous membrane of claim 1 wherein the first polymer is polyvinylidene fluoride.

5. The composite porous membrane of claim 1 wherein the first polymer is polytetrafluoroethylene.

6. The composite porous membrane of claim 1 wherein the first polymer is a hydrocarbon polymer.

7. The composite porous membrane of claim 1 wherein the first polymer is a polysulfone polymer.

8. The composite porous membrane of claim 1 wherein the first polymer is a polyethersulfone polymer.

9. The composite porous membrane of any one of claims 1, 2, 3, 4, 5, 6, 7 or 8 wherein said second polymer is formed from an hydroxyalkyl acrylate or methacrylate.

10. The composite porous membrane of any one of claims 1, 2, 3, 4, 5, 6, 7 or 8 wherein the second polymer is formed from a hydroxyalkyl acrylate or methacrylate which is cross-linked with propylene glycol diacrylate.

11. The composite porous membrane of any one of claims 1, 2, 3, 4, 5, 6, 7 and 8 wherein the second polymer is formed from a hydroxyalkyl acrylate or methacrylate which is cross-linked with tetraethylene glycol diacrylate.

12. The composite porous membrane of any one of claims 1, 2, 3, 4, 5, 6, 7 or 8 wherein the second polymer is formed from an acrylamide or methacrylamide which is cross-linked with a difunctional acrylamide or methacrylamide.

13. The composite porous membrane of any one of claims 1, 2, 3, 4, 5, 6, 7 or 8 wherein the second polymer is formed from a polar-substituted acrylate or methacrylate which is cross-linked with a difunctional acrylate or methacrylate.

14. The composite porous membrane of any one of claims 1, 2, 3, 4, 5, 6, 7 or 8 wherein the second polymer is formed from a functionally-substituted acrylate or methacrylate which is cross-linked with a difunctional acrylate or methacrylate.

15. The process for forming a composite porous membrane formed from a porous membrane substrate having an average pore size between about 0.001 and 10 microns formed of a first polymer, said substrate being directly coated over its entire surface with a crosslinked second polymer, said composite porous membrane having essentially the same porous configuration as said porous membrane substrate which comprises:
   (a) washing said porous membrane substrate to wet the surfaces of the pores in said porous membrane; and
   (b) contacting said porous membrane from step (a) with a solution of a monomer of said second polymer, a cross-linking agent for said monomer and a polymerization initiator for said monomer under conditions to polymerize said monomer and to cross-link said second polymer in situ over the entire surface of said first polymer under conditions to avoid plugging of said pores.

16. The process of claim 15 wherein said first polymer is a halogenated hydrocarbon polymer.

17. The process of claim 15 wherein said first polymer is a fluorinated hydrocarbon polymer.

18. The process of claim 15 wherein said first polymer is polyvinylidene fluoride.

19. The process of claim 15 wherein said first polymer is poly(tetrafluorothylene).

20. The process of claim 15 wherein said first polymer is a hydrocarbon polymer.

21. The process of claim 15 wherein said first polymer is a polysulfone polymer.

22. The process of claim 15 wherein said first polymer is a polyethersulfone polymer.

23. The process of claim 15 wherein said first polymer is a polycarbonate polymer.

24. The process of any of claims 15, 16, 17, 18, 19, 20, 21, 22 or 23 wherein said monomer is a hydroxyalkyl acrylate or methacrylate.

25. The process of any of claims 15, 16, 17, 18, 19, 20, 21, 22 or 23 wherein said monomer is an acrylamide or methacrylamide.

26. The process of any of claims 15, 16, 17, 18, 19, 20, 21, 22 or 23 wherein said monomer is a polar-substituted acrylate or methacrylate.

27. The process of any of claims 15, 16, 17, 18, 19, 20, 21, 22 or 23 wherein said monomer is functionally-substituted acrylate or methacrylate.

28. The process of any of claims 15, 16, 17, 18, 19, 20, 21, 22 or 23 wherein said monomer is a hydroxyalkyl acrylate and said cross-linking agent is a difunctional acrylate or methacrylate.

29. The process of any of claims 15, 16, 17, 18, 19, 20, 21, 22 or 23 wherein said cross-linking agent is a difunctional acrylate or methacrylate.

30. The process of any claims 15, 16, 17, 18, 19, 20, 21, 22 or 23 wherein said cross-linking agent is a multifunctional acrylate or methacrylate.

31. The process of any of claims 15, 16, 17, 18, 19, 20, 21, 22 or 23 wherein said cross-linking agent is a difunctional acrylamide or methacrylamide.

32. The process of claim 15 wherein said polymerization initiator is a persulfate compound.

33. The process of claim 15 wherein said polymerization initiator is ammonium persulfate.

34. The process of claim 15 wherein said polymerization initiator is an azo compound.

35. The process of any of claim 15 wherein said polymerization initiator is an organic peroxy compound.

36. The process of any of claim 15 wherein said monomer is a hydroxyalkyl acrylate or methacrylate, said cross-linking agent is tetraethylene glycol diacrylate, and said polymerization initiator is ammonium persulfate.

37. The composite porous product of any of claim 1, 2, 3, 4, 5, 6, 7 or 8 wherein the second polymer is formed from a polar substituted acrylate or methacrylate.

38. The composite porous product of any one of claims 1, 2, 3, 4, 5, 6, 7 or 8 wherein the second polymer is formed from a multifunctional acrylate or methacrylate.

* * * * *